United States Patent
Lyakhovitskiy et al.

(10) Patent No.: US 8,856,553 B2
(45) Date of Patent: Oct. 7, 2014

(54) MANAGING SELF-ENCRYPTING DRIVES IN DECENTRALIZED ENVIRONMENTS

(75) Inventors: Grigory B Lyakhovitskiy, Bothell, WA (US); Michael H. Tsang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 271 days.

(21) Appl. No.: 13/229,765

(22) Filed: Sep. 12, 2011

(65) Prior Publication Data

US 2013/0067242 A1 Mar. 14, 2013

(51) Int. Cl.
*G06F 12/14* (2006.01)
*G06F 21/00* (2013.01)

(52) U.S. Cl.
CPC ...................................... *G06F 21/00* (2013.01)
USPC ............................ 713/193; 380/277; 711/100

(58) Field of Classification Search
CPC .... G06F 21/00; G06F 21/6218; G06F 21/805
USPC .............. 380/44, 47, 277; 713/189, 190, 193; 711/100, 152, 163
See application file for complete search history.

(56) References Cited

U.S. PATENT DOCUMENTS

| 8,065,523 B2 * | 11/2011 | Fujii et al. ...................... 713/165 |
| 8,442,235 B2 * | 5/2013 | Lyakhovitskiy .............. 380/277 |
| 8,503,674 B2 * | 8/2013 | Ureche et al. .................... 380/47 |
| 2001/0039620 A1 * | 11/2001 | Berry et al. ..................... 713/193 |
| 2006/0123248 A1 * | 6/2006 | Porter et al. .................... 713/193 |
| 2007/0180210 A1 * | 8/2007 | Thibadeau ....................... 711/163 |
| 2010/0169948 A1 * | 7/2010 | Budko et al. ....................... 726/1 |
| 2010/0174922 A1 | 7/2010 | Johnson et al. |
| 2011/0264925 A1 * | 10/2011 | Russo et al. .................... 713/193 |
| 2011/0314279 A1 * | 12/2011 | Ureche et al. .................. 713/167 |
| 2012/0173882 A1 * | 7/2012 | Horn et al. ..................... 713/189 |
| 2012/0275596 A1 * | 11/2012 | Ureche et al. .................... 380/47 |
| 2012/0284527 A1 * | 11/2012 | Nagpal et al. ................. 713/189 |

OTHER PUBLICATIONS

Toward Standardization of Self-Encrypting Storage, Laszlo Hars, Security in Storage Workshop, 2008.*
Encryption: Security Considerations for Portable Media Devices, Faith M. Heikkila, pp. 22-27, IEEE 2007.*
Entrprise SED Presentation TCG Storage WG Marketing, Slides 1-23, Trusted Computing Group, 2010.*
Figueroa, James., "Trusted Computing Shapes Self-Encrypting Drives", Retrieved at <<http://www.computer.org/portal/web/computingnow/archive/news014>> Apr. 2009, pp. 4.
"Comply with Data Protection Laws and Regulations", Retrieved at <<http://www.wave.com/about/whitepapers/FDE-Compliance2.pdf>>, Oct. 2007, pp. 56.

(Continued)

*Primary Examiner* — David García Cervetti
*Assistant Examiner* — Shanto M Abedin
(74) *Attorney, Agent, or Firm* — John Jardine; Raghu Chinagudabha; Micky Minhas

(57) ABSTRACT

A self-encrypting drive allows finely grained control, i.e., the ability to create, protect, lock and unlock, of different volumes on the same drive. The different volumes enable multiple different operating systems to be booted, depending on the volume that is selected for booting.

20 Claims, 9 Drawing Sheets

(56) References Cited

OTHER PUBLICATIONS

"Ten Reasons to Buy Self-Encrypting Drives", Retrieved at <<http://www.trustedcomputinggroup.org/files/resource_files/0B942977-1A4B-B294-D0CFD24A431444FF/10%20Reasons%20to%20Buy%20SEDs_Sept.2010.pdf>>, Sep. 2010, pp. 15.

Allen, Lark, "Strong user authentication in self-encrypting drives", Retrieved at <<http://investorshub.advfn.com/boards/read_msg.aspx?message_id=56019850#>>, Oct. 28, 2010, pp. 7.

"DriveArmor™ is a Management, Authentication & Reporting Solution for Self-Encrypting Hard Drives", Retrieved at <<http://www.mobilearmor.com/pdfs/DriveArmor.pdf>>, Retrieved Date: Jun. 23, 2011, pp. 2.

"SecureDoc Competitive Checklist", Retrieved at <<http://www.winmagic.com/products/securedoc-competitive-checklist>>, Retrieved Date: Jun. 23, 2011, pp. 3.

"McAfee Endpoint Encryption", Retrieved at <<http://www.spectrum-systems.com/vendors/mcafee/EndpointEncryption.pdf>>, Retrieved Date: Jun. 23, 2011, pp. 2.

"Extensible Management of Self-Encrypting Storage Devices", U.S. Appl. No. 12/760,181, filed Apr. 14, 2010, pp. 43.

* cited by examiner

MANAGING SELF-ENCRYPTING DRIVES IN DECENTRALIZED ENVIRONMENTS

BACKGROUND

Self-encrypting drives are commonly used in computers to protect information stored on a disk drive from unauthorized access. In general, all of the information on the disk drive is encrypted before it is stored on the disk drive. It is decrypted when read from the disk drive by an authorized system for an authorized user.

The decryption typically uses a key that is related to both the authorized system (such as a system identifier) and the authorized user (such as a user name and password). Thus, if physical access to the disk drive is achieved, such as through theft or loss, then the data can remain protected if the system identifier and user authentication information is unavailable.

Due to limitations of key management software, self-encrypting drives protect an entire disk. In other words, the entire disk drive is either protected, or remains unprotected, by one decryption key.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

It is desirable to have a self-encrypting drive and corresponding management software that allows more finely grained control than the ability to lock or unlock an entire drive. In particular, it is desirable to be able to create volumes on the drive, and enable and disable different volumes in different ways. Having multiple different volumes also allows self-encrypting drives to be used in systems that allow multiple different operating systems to be booted. An operating system booted from one volume could be prevented from accessing data in other volumes.

Accordingly, in one aspect, a computer system includes one or more processors that execute an operating system that manages access to resources in the computer system. In another aspect, an article of manufacture includes a computer storage medium with computer program instructions that, when processed, executes an operating system that manages access to resources in the computer system.

One of the resources is a self-encrypting drive. The operating system includes code that manages access to the self encrypting drive, including code that provisions the self-encrypting drive. A provisioned drive includes one or more locking ranges and a global range, and data structures for maintaining information about these ranges. In particular, these data structures include a data store object, an authority object and a locking range object. The data store object stores information for each locking range, including key management data. An authority object for each locking range stores authentication information for the locking range. A locking range object for each locking range stores state information for the locking range. These data structures are implemented as random access data storage persisted across resets and power cycles.

In one embodiment, the provisioning process includes ensuring the data store object, authority object and locking range object are configured for each locking range. All users are enabled to read the data store object, authority object (except for the PIN) and locking range objects. However only the user assigned to the locking range is enabled to modify the data store object, authority object and locking range objects for the locking range. The provisioning process also can include disabling authorities other than a user authority for each locking range, and a physical presence authority for the drive. All locking ranges other than the global range can be disabled. Access control for each locking range is set to provide for a single user authority. Cryptographic erase of a locking range without user authentication is enabled.

The operating system can further include code that creates a volume, by associating a volume identifier with a locking range, activates and deactivates protection of a volume, locks and unlocks a volume, and removes a volume.

There can be a plurality of volumes on the self-encrypted drive. There can be multiple volumes, but with fewer than all volumes and as few as one volume being protected using drive's self-encrypting capabilities. Other volumes can be protected with a different mechanism or not protected at all. A volume can store an operating system. Different volumes can store different operating systems.

In one embodiment, where a volume stores an operating system that can be booted, a boot manager obtains credentials, unseals the locking range, and unlocks the range, prior to booting the operating system. If different volumes store different operating systems, a centralized boot manager selects a volume from which to boot an operating system. This boot manager can include a key manager, and uses the key manager and key information stored in the data store for a locking range corresponding to the selected volume to unlock the volume and boot the operating system. In another embodiment, a volume to unlock is identified and unlocked by firmware, and a boot manager is instructed to boot the operating system from the unlocked volume.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example computing environment in which such self-encrypting drives can be implemented. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 1:
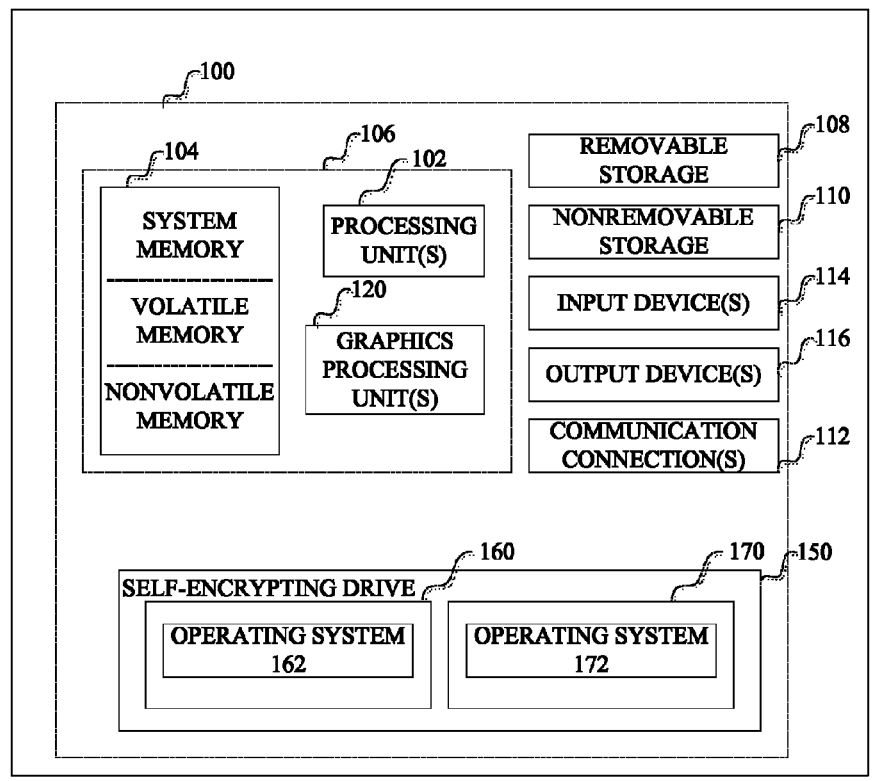
FIG. 1 is a block diagram of an example computing device in which such a system can be implemented.

FIG. 1 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 1, an example computing environment includes a computing machine, such as computing machine 100. In its most basic configuration, computing machine 100 typically includes at least one processing unit 102 and memory 104. The computing device may include multiple processing units and/or additional co-processing units such as graphics processing unit 120. Depending on the configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, computing machine 100 may also have additional features/functionality. For example, computing machine 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer program instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 100. Any such computer storage media may be part of computing machine 100.

Computing machine 100 may also contain communications connection(s) 112 that allow the device to communicate with other devices. Communications connection(s) 112 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 100 may have various input device(s) 114 such as a keyboard, mouse, pen, camera, touch input device, and so on. Output device(s) 116 such as a display, speakers, a printer, and so on may also be included. All of these devices are well known in the art and need not be discussed at length here.

This system may be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types.

Turning again to the computer storage in the computing machine 100, the computing storage can include a self-encrypting drive 150. This self-encrypting drive includes one or more volumes 160, 170. There can be multiple volumes, but with fewer than all volumes and as few as one volume being protected using drive's self-encrypting capabilities. Other volumes can be protected with a different mechanism or not protected at all. In one embodiment, each volume stores computer program code for a different operating environment or operating system. In particular, volume 160 can include a first operating system 162, whereas volume 170 can include a second operating system 172. It should be understood that a volume can include only data and not any operating system.

The operating configures the self-encrypting drive in such a way that newly created volumes can be individually locked by the host without protocol-level authentication, unlocked with protocol-level authentication (using a key assigned at lock time), and erased/deleted without protocol-level authentication. This security model is then locked in. The identifier for the supervisor authority (SID) can be set to a non-default value and securely stored on the disk or elsewhere in the system (such as in firmware). The SID also can be disabled.

In order for multiple operating systems to be able to boot from a self-encrypting drive, they use either a common boot manager that can unlock each of the operating system volumes, or bootstrap firmware that executes key management code before the boot manager.

In the following example implementation, the self-encrypting drive is described as a Trusted Computing Group (TCG) OPAL drives. This implementation is based on draft specifications for version 2.00 with optional Single User Mode Feature Set and Additional Data Store Table Feature Set. It should be understood that any self-encrypting drive that provides security primitives, such as the locking ranges and authorities described below, in a manner similar to TCG OPAL drives could be used in an implementation.

In particular, the security primitives used to implement such a self-encrypting drive will now be described.

A first primitive is the ability to define one or more locking ranges. A "locking range" is a subset of logical block addresses (LBAs) having a "media encryption key" (MEK) assigned to it. For example, each locking range can have a unique MEK. The MEK is stored in the self-encrypting drive and is not released to the host. The host has an ability to specify which LBAs are in a locking range. Any LBAs that do not belong to any locking range are part of a "global range."

Another security primitive is one or more authorities that can be authenticated with using a personal identification number (PIN), which is any key that can be directly passed to the self-encrypting drive by the host.

Another security primitive is the ability for the host to lock and temporarily/persistently unlock a locking range. In other words, the host can specify whether the self-encrypting drive rejects or processes read/write requests affecting a certain locking range, and whether the locking range automatically locks on power-cycle. If a read or write is processed by the self-encrypting drive, it automatically decrypts/encrypts data with MEK using a symmetric encryption algorithm after reading/before writing it from/to the media, so that plaintext is transmitted over the bus and crypto text is stored on the media.

Another security primitive is the ability to designate which authorities are allowed to lock/unlock/resize locking ranges via access control lists (ACLs). This designation can be performed by a host or when the drive is configured during manufacturing.

Another security primitive is the ability for the self-encrypting drive to internally encrypt a locking range's MEK with a combination of the PINs of the authorities assigned to the locking range or derivatives of those PINs.

Another security primitive is the ability for the host to cryptographically erase a locking range by forcing the self-encrypting drive to replace the locking range's MEK with a new random key, and, possibly, to reset the PINs of the authorities assigned to the Locking Range.

Another security primitive is the ability to partition additional storage space and associate such storage space with locking ranges and authorities, which can be used by the host to store additional metadata. Another security primitive is the ability for the host to assign which authorities are allowed to read/write these additional storage space partitions via Access Control Lists (ACLs).

Another security primitive is a Supervisor Authority representing the self-encrypting drive owner. Authentication with this authority (if it is not disabled) allows the host to change ACLs, and thus redefine the security model of the self-encrypting drive. A Physical Presence Authority also represents the self-encrypting drive owner. It is equivalent to the Supervisor Authority, but its PIN cannot be changed and its default PIN cannot be programmatically read.

In addition to these primitives, several data objects are maintained for key management for each locking range. These include an authority object, a locking object and a data store object. With multiple locking ranges, there are multiple authority, locking and data store objects per drive. The authority object and locking object for a volume can be implemented as a row in an authority table or locking table in the TCG OPAL specifications; however these tables can be simplified as follows.

The authority object can use a common name field (column 2 of table 177 of Version 2.00 of the TCG Core Specification) for a 32-byte key manager identifier. This object also can include a credential field (column 10 of table 177 of the TCG Core Specification) which refers to another object in which a 32-byte PIN is stored.

The locking object includes a common name field, which is used for 32 bytes of volume metadata. A range start field specifies the starting LBA of the range. A range length field specifies the size of the LBA range. A read lock enabled field specifies whether the read lock of the range is enabled. A write lock enabled field specifies if the write lock of the range is enabled. A read locked flag specifies if the range is locked for read. A write locked flag specifies if the range is locked for write. A lock on reset field specifies conditions that reset the lock states of the range, such as a power cycle. These fields correspond to columns 2 through 9 of Table 224 in Version 2.0 of the TCG Core Specification.

The data store object can be implemented as a byte table, partitioned into multiple tables, with one table per range supported by the device. It can be used by the host for generic secure data storage. Thus, each range can have its own data store object for the key managers to store key management metadata about the range. This data store object is similar to the data store table of Section 4.3.7.1 of Version 1.0 of the TCG Opal Specification, except modified to have one table per range supported by the device.

Given a computer system that accesses a self encrypting drive having such security primitives and data objects, several operations can be performed.

Figure 2:
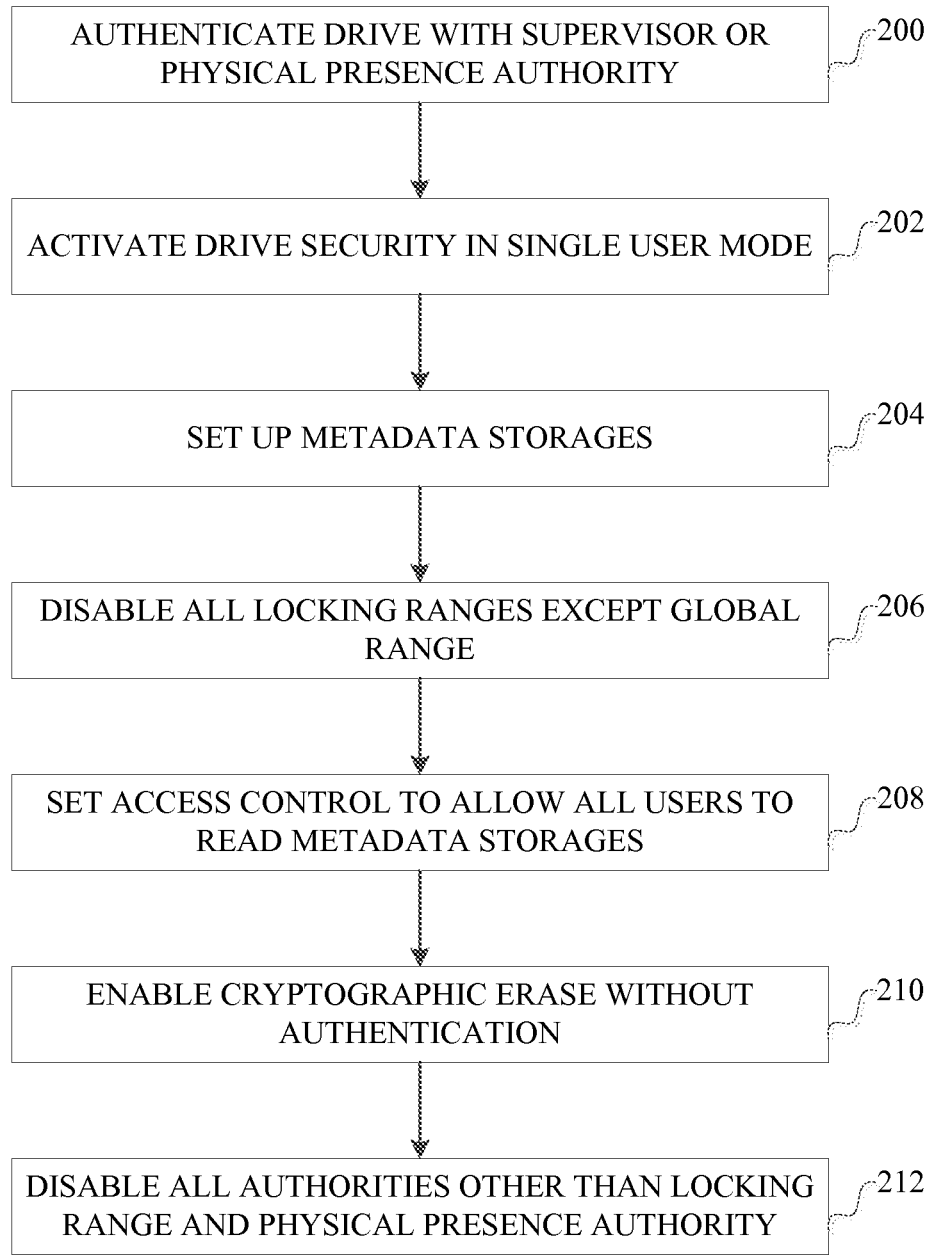
FIG. 2 is a flow chart describing an example operation for provisioning a drive.

First, a self-encrypting drive is provisioned for use with the host computer, as will now be described in connection with FIG. 2.

First, the drive is authenticated 200 with Supervisor Authority or the Physical Presence Authority representing the owner. In TCG-compliant drives, the Supervisor Authority is the security identifier (SID) authority of the administrator security provider (Admin SP). The drive security is activated 202, and the locking range ACLs are configured. As an example, each locking range can be set up to be controlled by a single and unique user authority. A locking range authority is able to lock/unlock/resize its corresponding locking range and does not have control over any other locking range. In a TCG-based drive this means activating single user mode features for an entire locking table.

Metadata storages, for each locking range, are set up 204. In particular, a volume identifier storage (the common name field of the locking object of the locking security provider (Locking SP) that stores an identifier, such as a globally unique identifier (GUID), for the volume), a key manager identifier storage (the common name field of the authority object of the LockingSP), and a key manager metadata storage (the data store object of the LockingSP is partitioned into chunks, one for each locking range), are set up.

All locking ranges except for the global range are disabled 206. Such disabling can be accomplished by ensuring these ranges do not contain any LBAs. The access control lists are set 208 so that anybody can read the metadata storages (step 204), but only the user authority assigned to the corresponding locking range can modify each metadata storage. For example, the ACLs for a given data store object, e.g., DataStoreXXXX for volumeXXXX, is set to allow "Anybody" authority to read DataStoreXXXX but "UserXXXX" authority to modify it.

The authorization to perform a cryptographic erase of a locking range without authentication is enabled 210. For example, the ACL for an erase method in the locking object can be set to "Anybody." Finally, all authorities other than the locking range authorities and the physical presence authority can be disabled 212. For example, in a TCG-based drive, all "AdminXXXX" authorities in the locking security provider (Locking SP) and the security identifier (SID) authority in the administrator security provider (Admin SP) are disabled. As another example, new (random) PINs can be assigned to the SID and zero or more of AdminXXXX, while the rest of AdminXXXX are disabled, so long as the AdminXXXX and SID PINs are protected in such a way that they are not available in clear on the drive and the host. If an authority cannot be disabled, then it can be reassigned a random PIN which is then discarded by the system.

Figure 3:
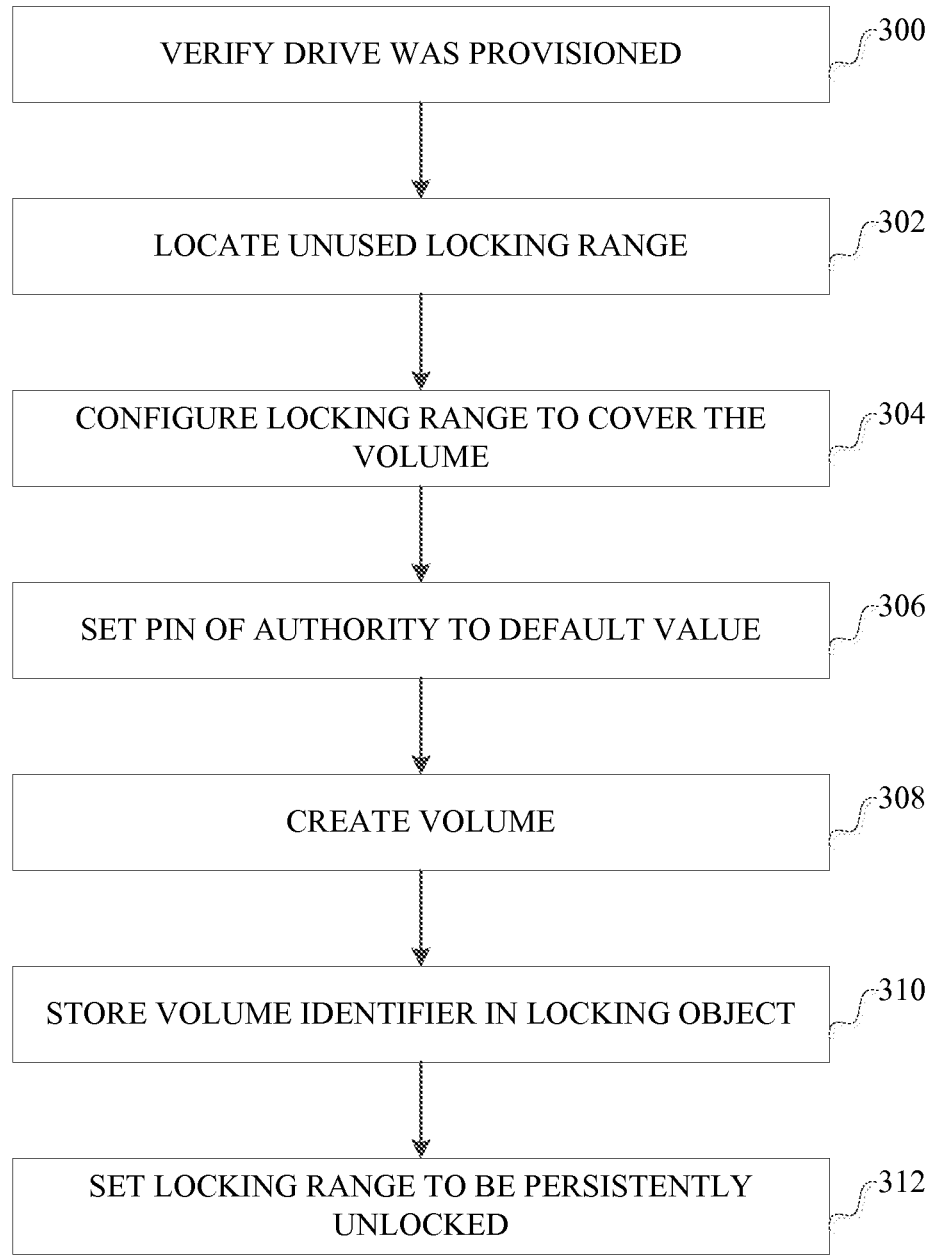
FIG. 3 is a flow chart describing an example operation for creating a volume.

Referring now to FIG. 3, a volume creation procedure will now be described. To create a volume, first the host verifies 300 that the self-encrypting drive was provisioned in a compatible mode. For example, in a TCG-based drive, this involves verifying that the LockingSP is in the active state and the single user mode has been enabled for all locking ranges. An unused locking range other than the global range is located 302. This locking range is configured 304 to cover the LBA blocks to be occupied by the new volume. The PIN of the corresponding authority is set 306 to a default value. The volume is then created 308, by making appropriate changes to the disk drive data structures, such as a master boot record (MBR) or partition table (GPT). The volume identifier (such as a GUID) can be stored 310 in the volume identifier storage field for this locking range. Finally, the locking range is set 312 to be persistently unlocked. For example, in a TCG-based drive, the read lock enable and write lock enable flags in the locking range object can be set to false.

Figure 4:
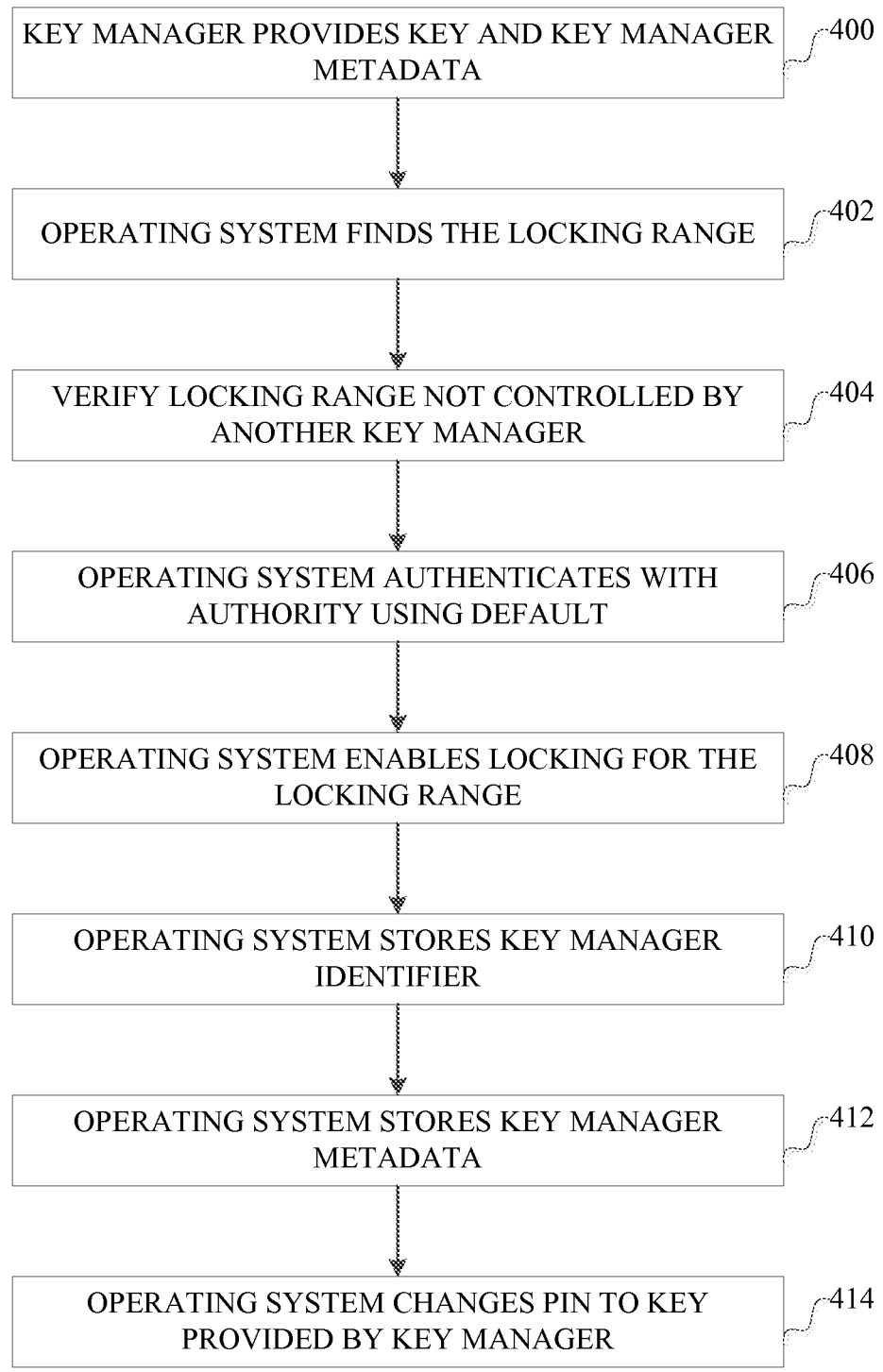
FIG. 4 is a flow chart describing an example operation for activating protection.

Referring now to FIG. 4, a volume protection activation procedure will now be described. To protect a volume, a key manager provides 400 a key to be assigned to the volume, along with key manager metadata. Volume keys are encrypted with user credentials. The operating system finds 402 the corresponding locking range by volume offset or volume identifier. The operating system can verify 404 that the locking range is not controlled by another key manager by comparing the key manager identifier, such as a GUID, and the value in the Key Manager identifier storage of that locking range. For example, in a TCG-based drive, the common name field of the authority object for the user can be inspected. The operating system authenticates 406 with the corresponding authority using the default value. The operating system then enables 408 locking for the locking range and ensures that the locking range automatically locks on power cycle. For example, in a TCG-based drive, the read lock enable and write lock enable columns of the locking range object are set to TRUE, and the lock on reset column of the locking range object is modified to contain "Power Cycle". The operating system then stores 410 the Key Manager identifier in the Key Manager identifier storage of that locking range. The operating system stores 412 the key manager metadata to the key manager metadata storage, such as in the DataStoreXXXX object corresponding to the locking range. Finally, the operating system changes 414 the PIN of the locking range authority to the key provided by the key manager.

Figure 5:
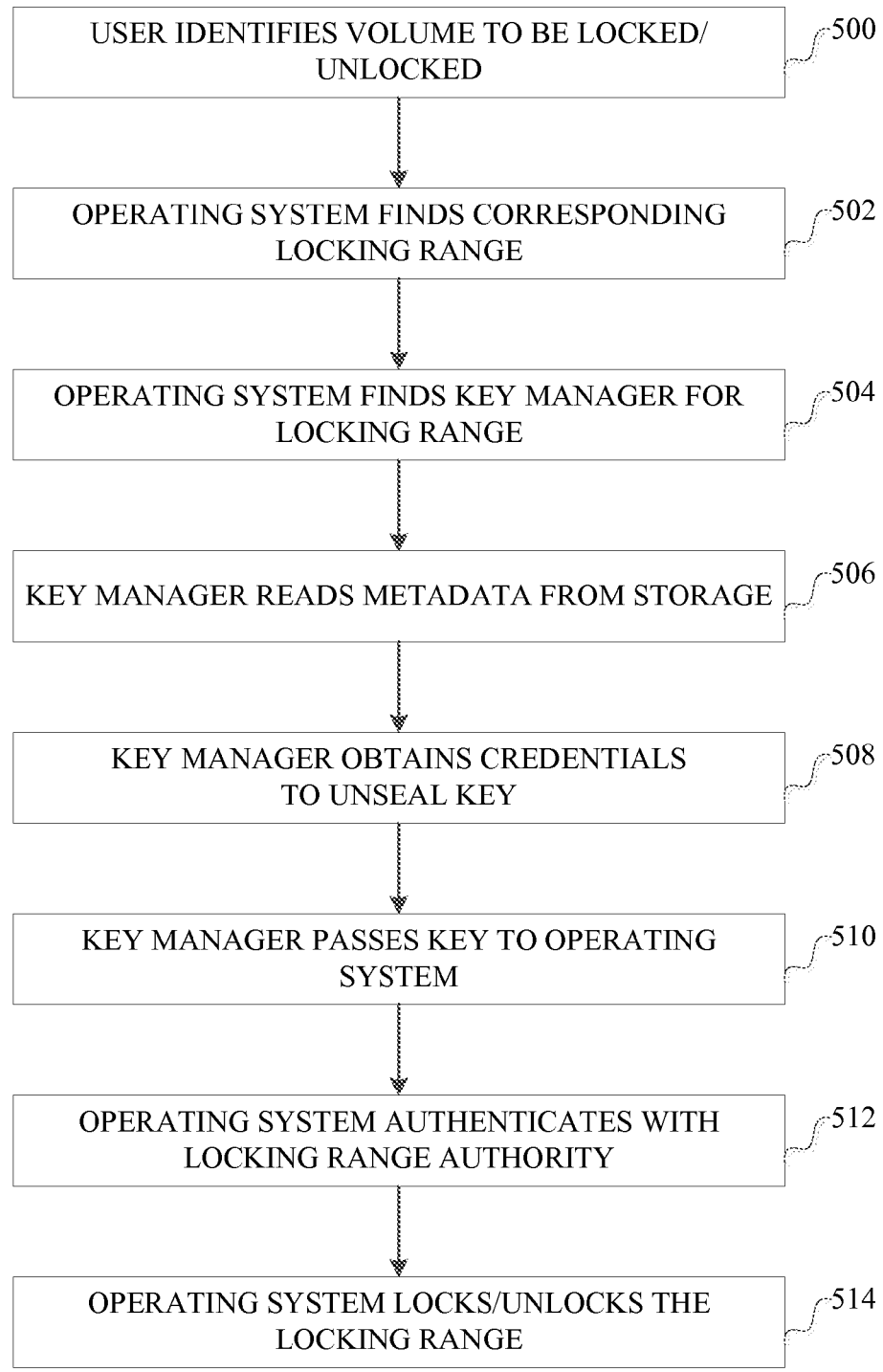
FIG. 5 is a flow chart describing an example operation for locking a volume.

Given a protected volume, a user can now lock or unlock the volume. This process is described in connection with FIG. 5. First, the user identifies 500 a volume to be locked or unlocked. The operating system finds 502 the corresponding locking range by volume offset or volume identifier. The operating system finds 504 the key manager that activated protection for the volume, for example, by using the key manager identifier stored in the key manager identifier storage of the locking range. The key manager reads 506 metadata from the key manager metadata storage of the locking range, and obtains 508 credentials to unseal the volume key from one of the key protectors. The key manager passes 510 the volume key to the operating system. The operating system authenticates 512 with the locking range authority using the key provided by the key manager, and then locks or unlocks 514 the locking range. For example, in TCG-based drives, the operating system sets the read lock and write locked columns of the locking range object to FALSE (if it needs to be unlocked) or TRUE (if it needs to be locked).

Figure 6:
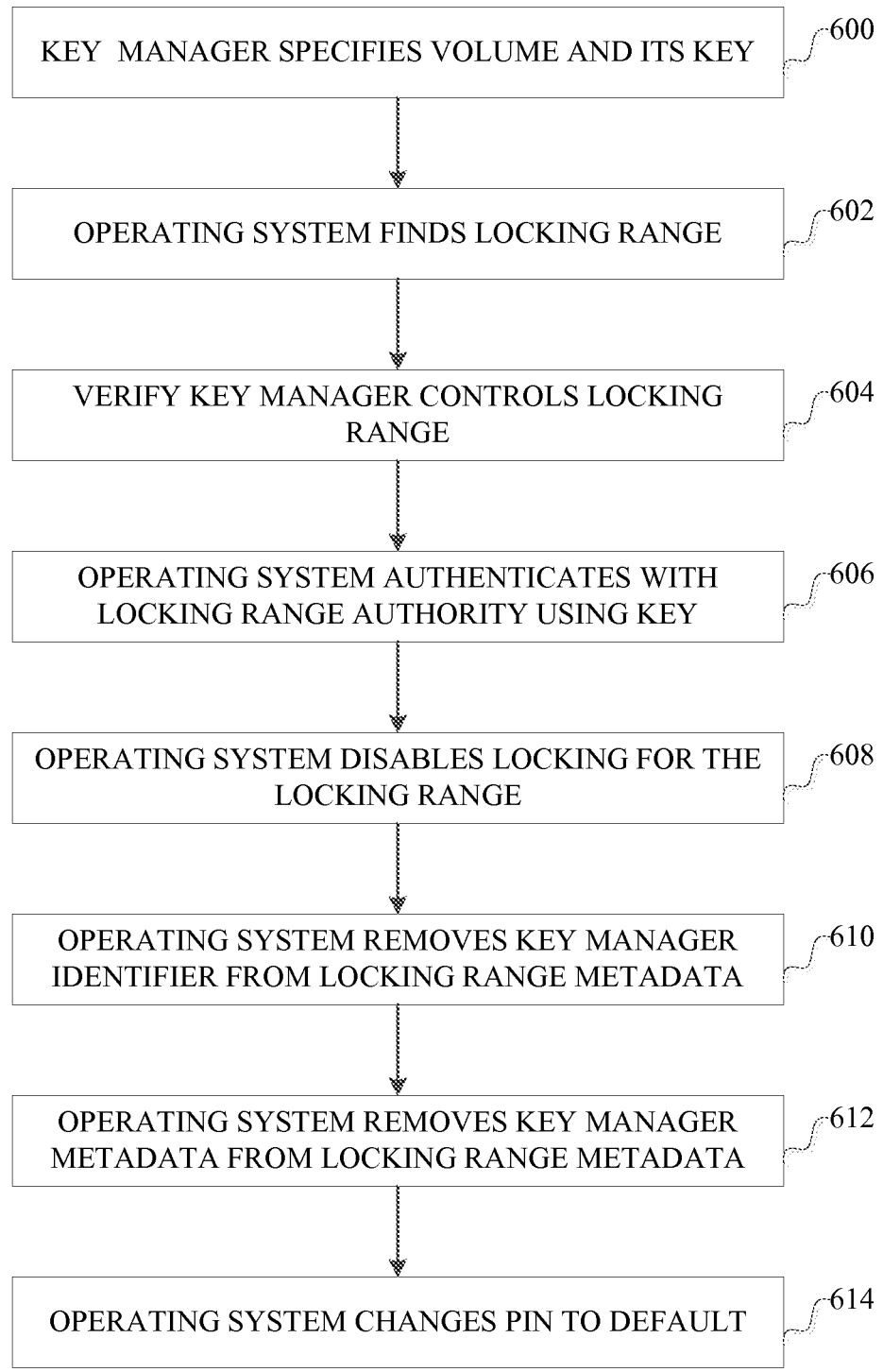
FIG. 6 is a flow chart describing an example operation for deactivating protection.

As with any protected system, there may come a time when the protection is to be deactivated for some reason. The process of deactivating protection of a volume will now be described in connection with FIG. 6.

A key manager specifies 600 a volume and the volume key assigned to it. The operating system finds 602 the corresponding locking range by volume offset or volume identifier. The operating system can verify 604 that the locking range is controlled by the key manager by comparing the key manager identifier and the value in the key manager identifier storage of that locking range. For example, in a TCG-based drive, the operating system can inspect the common name field of the authority object for the user. The operating system authenticates 606 with the corresponding locking range authority using the key provided by the key manager. After authentication, the operating system disables 608 locking for the locking range. In a TCG-based drive, the read lock enable and write lock enable columns of the locking range object are set to FALSE. The operating system then removes 610 the key manager identifier from the key manager identifier storage of the locking range, and removes 612 the key manager metadata from the key manager metadata storage of the locking range. Finally, the operating system changes 614 the locking range authority PIN to the default value.

Figure 7:
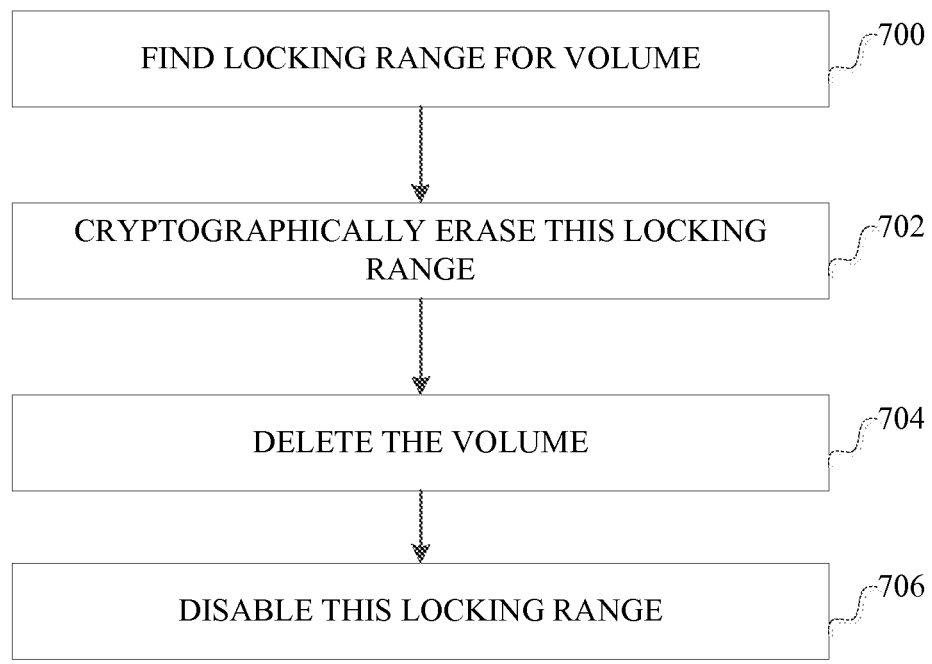
FIG. 7 is a flow chart describing an example operation for removing a volume.

After protection is deactivated for a volume, the volume can be removed. A process for removing a volume will be described in connection with FIG. 7.

The locking range corresponding to the volume is found 700 by volume offset or volume identifier. This locking range is then cryptographically erased 702. For example, on a TCG-based drive, an erase method is called on that locking range. Next the locking range is disabled 706 by removing all LBAs from it. For example, for a TCG-based drive, the range start and range lengths values can be set to zero. The MBR/GPT table is updated accordingly to delete the volume, after erasing and before disabling the range as shown at 704, or after disabling the range.

Having now described how to create, protect, lock and unlock, deactivate protection and remove volumes, the following will describe how to use such a system to allow multi-boot support. A process for providing multi-boot support using a common boot manager will be described in connection with FIG. 8. A process for multi-boot support using unified extended firmware interface (UEFI) applications will be described in connection with FIG. 9.

Figure 8:
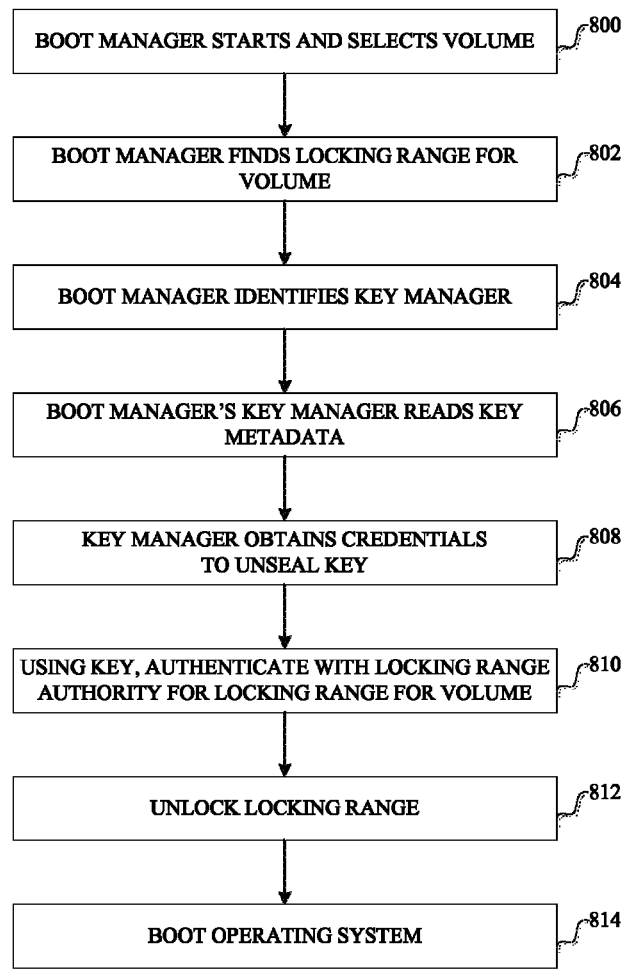
FIG. 8 is a flow chart describing an example operation for multiboot support using a boot manager.

In FIG. 8, the boot manager starts 800 and determines which volume to boot from. The boot manager finds 802 the locking range corresponding to the volume by volume offset or volume identifier. The boot manager identifies 804 the key manager which activated protection for the volume, for example by using the key manager identifier stored in the key manager identifier storage of the locking range. A key manager built into the boot manager reads 806 metadata from the key manager metadata storage of the locking range. The key manager obtains 808 credentials to unseal the volume key from one of the key protectors. The credentials can be, for example, user credentials, a key from a network server, or key from the host. Either the key manager or the boot manager then authenticates 810 with the locking range authority using the volume key obtained by the key manager. The key manager or boot manager temporarily unlocks 812 the locking range. Finally, the boot manager proceeds to booting 814 the operating system from the unlocked volume.

Figure 9:
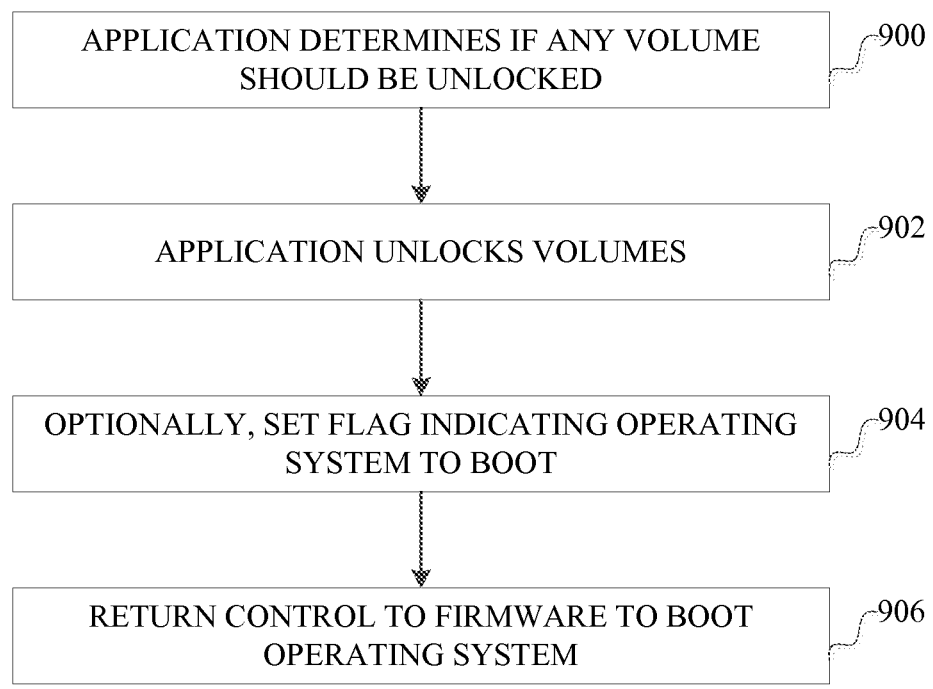
FIG. 9 is a flow chart describing an example operation for multiboot support using UEFI.

In FIG. 9, for UEFI applications, at setup time, each key manager that wants to support operating system volume protection installs its own UEFI application and adds it to the boot list. Then, at the boot time, the UEFI firmware runs each of those applications and they follow the process in FIG. 9. First, the application determines 900 if any volumes are to be unlocked. This may include scanning volumes via one or more UEFI Media Access Protocols, retrieving key manager identifier and metadata via the UEFI Storage Security Command Protocol, and obtaining user credentials by using one or more UEFI Console or other protocols. Next, the application unlocks 902 one or more volumes by sending appropriate security commands to the drive via the UEFI Storage Security Command Protocol. Optionally, a global flag can be set 904 indicating to the operating system boot manager from which volume to boot, e.g. in the boot configuration data area (BCD). Control is returned 906 to the UEFI firmware, which executes other UEFI applications and eventually the operating system boot manager, which will boot the operating system from one of the volumes.

Having now described an example implementation of a self-encrypting drive that allows more finely grained control, i.e., the ability to create, protect, lock and unlock different volumes on the same drive. The different volumes enable multiple different operating systems to be booted, depending on the volume that is selected for booting. It should be understood that the foregoing description is merely an example implementation, based in part on modifications to TCG Specifications for self-encrypting drives, and that other implementations are possible and need not rely on TCG-based drives. Other drives having similar attributes in the ability to track volume state and metadata and key metadata also can be used.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

What is claimed is:

1. A computer system comprising:
   one or more processing devices, wherein the one or more processing devices process computer program instructions;
   a self-encrypting drive including nonvolatile storage;
   wherein the computer program instructions, when processed by the one or more processing devices, provision the self-encrypting drive, wherein a provisioned drive on the self-encrypting drive includes:
   one or more locking ranges and a global range;
   an authority object for each locking range that stores authentication information for the locking range,
   a locking range object for each locking range that stores state information for the locking range, and
   a data store object including information stored for each locking range including key management data; and
   the provision process comprising:
   configuring the authority object and locking range object for each locking range; and
   enabling all users to read the authority object and locking range objects, but enabling only the user assigned to the locking range to modify the authority object and locking range objects for the locking range.

2. The computer system of claim 1 wherein the provisioning process further comprises disabling authorities other than a user authority and a physical presence authority for each locking range.

3. The computer system of claim 1, wherein the provisioning process further comprises disabling all locking ranges other than the global range.

4. The computer system of claim 1, wherein the provisioning process further comprises setting access control for each locking range to provide for a single user authority.

5. The computer system of claim 1, wherein the provisioning process further comprises enabling cryptographic erase of a locking range without user authentication.

6. The computer system of claim 1, wherein the computer program instructions, further include code that, when processed, creates a volume by aligning a locking range with the volume.

7. The computer system of claim 6, wherein the computer program instructions further include code that, when processed, activates protection of a volume.

8. The computer system of claim 7, wherein the computer program instructions, further include code that, when processed, deactivates protection of a volume.

9. The computer system of claim 7, wherein the computer program instructions further include code that, when processed, locks a volume.

10. The computer system of claim 9, wherein the computer program instructions further include code that, when processed, unlocks a volume.

11. The computer system of claim 6 wherein the computer program instructions further include code that, when processed, removes a volume by disabling the locking range associated with the volume.

12. The computer system of claim 1, further comprising a plurality of volumes on the self-encrypted drive, each volume including a different operating system.

13. The computer system of claim 12, further comprising a centralized boot manager which selects a volume from which to boot an operating system.

14. The computer system of claim 13, wherein the boot manager includes a key manager, and wherein the boot manager uses the key manager and key information stored in the data store for a locking range corresponding to the selected volume to unlock the volume and boot the operating system.

15. The computer system of claim 12, further comprising computer program instructions that, when processed, perform a process comprising:
    identifying a volume to unlock;
    unlocking the identified volume; and
    instructing a boot manager to boot the operating system from the unlocked volume.

16. An article of manufacture comprising:
    a computer storage medium, including at least one of memory and nonvolatile storage;
    computer program instructions stored on the computer storage medium which, when processed by a processing device, instruct the processing device to perform a process for provisioning a self-encrypting drive comprising:
    specifying one or more locking ranges and a global range;
    creating data structures for storing information about the specified ranges, including:
    an authority object for each locking range that stores authentication information for the locking range,
    a locking range object for each locking range that stores state information for the locking range, and
    a data store object including information stored for each locking range including key management data;
    configuring the authority object and locking range object for each locking range; and
    enabling all users to read the authority object and locking range objects, but enabling only the user assigned to the locking range to modify the authority object and locking range objects for the locking range.

17. The article of manufacture of claim 16, wherein the computer program instructions further include code that, when processed, creates a volume by aligning a locking range with the volume.

18. The article of manufacture of claim 16, further comprising a plurality of volumes on the self-encrypted drive, each volume including a different operating system.

19. A process for provisioning a self-encrypting drive including nonvolatile storage comprising:
   specifying one or more locking ranges and a global range;
   creating data structures on the self-encrypting drive for storing information about the specified ranges, including:
      an authority object for each locking range that stores authentication information for the locking range,
      a locking range object for each locking range that stores state information for the locking range, and
      a data store object including information stored for each locking range including key management data;
   configuring the authority object and locking range object for each locking range; and
   enabling all users to read the authority object and locking range objects on the self-encrypting drive, but enabling only the user assigned to the locking range to modify the authority object and locking range objects for the locking range.

20. The process of claim 19, further comprising provisioning a plurality of volumes on the self-encrypted drive, each volume including a different operating system.

* * * * *